United States Patent
Terrell et al.

(10) Patent No.: US 9,468,846 B2
(45) Date of Patent: Oct. 18, 2016

(54) TACTILE FEEDBACK APPARATUS AND METHOD

(75) Inventors: Scott Michael Terrell, La Mesa, CA (US); Antonio Meneses Ortega, San Diego, CA (US); Thomas John Roberts, Alpine, CA (US)

(73) Assignee: Performance Designed Products LLC, Sherman Oaks, CA (US)

( * ) Notice: Subject to any disclaimer, the term of this patent is extended or adjusted under 35 U.S.C. 154(b) by 2255 days.

(21) Appl. No.: 12/362,804

(22) Filed: Jan. 30, 2009

(65) Prior Publication Data
US 2010/0194547 A1 Aug. 5, 2010

(51) Int. Cl.
| | |
|---|---|
| G08B 6/00 | (2006.01) |
| G06F 3/033 | (2013.01) |
| G06F 3/01 | (2006.01) |
| G06F 17/00 | (2006.01) |
| A63F 13/285 | (2014.01) |
| A63F 13/24 | (2014.01) |

(Continued)

(52) U.S. Cl.
CPC ............ *A63F 13/285* (2014.09); *A63F 13/06* (2013.01); *A63F 13/24* (2014.09); *G06F 3/016* (2013.01); *G06F 3/03545* (2013.01); *A63F 13/211* (2014.09); *A63F 13/214* (2014.09); *A63F 13/218* (2014.09); *A63F 13/26* (2014.09); *A63F 2300/1037* (2013.01); *A63F 2300/1075* (2013.01); *A63F 2300/204* (2013.01); *A63F 2300/301* (2013.01)

(58) Field of Classification Search
USPC ..................................................... 340/407.2
See application file for complete search history.

(56) References Cited

U.S. PATENT DOCUMENTS

| | | | |
|---|---|---|---|
| 3,787,808 A | * | 1/1974 | Knopf .................... B60Q 1/444 340/464 |
| 4,030,208 A | | 6/1977 | Carver et al. |

(Continued)

FOREIGN PATENT DOCUMENTS

| | | |
|---|---|---|
| EP | 0237660 | 9/1987 |
| EP | 0406729 | 1/1991 |

(Continued)

OTHER PUBLICATIONS

Douglas Dixon: Eye-Fi—Wi-Fi SD Card for Digital Cameras, Internet Citation, Dec. 1 2007, pp. 1-5, XP002538265, http://www.manifest-tech.com/ce_photo/eye-fi-wi-fi.htm, screenshot Jul. 22, 2009.

(Continued)

*Primary Examiner* — Jennifer Mehmood
*Assistant Examiner* — John Mortell
(74) *Attorney, Agent, or Firm* — Sheppard Mullin Richter & Hampton LLP

(57) ABSTRACT

The present invention provides apparatuses and methods for a tactile feedback instrument, and more specifically, some embodiments are directed toward methods and apparatuses for a tactile feedback stylus. Some embodiments of the invention provide a stylus used in conjunction with mobile devices. Further embodiments of the invention provide a game system, comprising a game console and a stylus. Within such embodiments, the stylus comprises an electric motor and a control circuit coupled to the electric motor that is in communication with the game console and controls the electric motor. Within some of these embodiments, the stylus can vibrate or rumble when the electric motor is activated in response to gaming activity.

34 Claims, 4 Drawing Sheets

(51) Int. Cl.
*A63F 13/20* (2014.01)
*G06F 3/0354* (2013.01)
*A63F 13/211* (2014.01)
*A63F 13/26* (2014.01)
*A63F 13/218* (2014.01)
*A63F 13/214* (2014.01)

(56) References Cited

U.S. PATENT DOCUMENTS

| | | |
|---|---|---|
| 4,081,829 A | 3/1978 | Brown |
| 4,257,062 A | 3/1981 | Meredith |
| 4,424,967 A | 1/1984 | Yokoi et al. |
| 4,464,117 A | 8/1984 | Foerst |
| 4,477,069 A | 10/1984 | Crudgington, Jr. |
| 4,484,191 A | 11/1984 | Vavra |
| 4,518,164 A | 5/1985 | Hayford, Jr. |
| 4,521,021 A | 6/1985 | Dixon |
| 4,710,129 A | 12/1987 | Newman et al. |
| 4,762,227 A | 8/1988 | Patterson |
| 4,824,059 A | 4/1989 | Butler |
| 4,836,256 A | 6/1989 | Meliconi |
| 4,858,930 A | 8/1989 | Sato |
| 4,949,119 A | 8/1990 | Moncrief et al. |
| 4,976,438 A | 12/1990 | Tashiro et al. |
| 4,988,981 A | 1/1991 | Zimmerman et al. |
| 5,044,956 A | 9/1991 | Behensky et al. |
| 5,184,319 A | 2/1993 | Kramer |
| 5,255,211 A | 10/1993 | Redmond |
| 5,265,720 A | 11/1993 | Meliconi |
| 5,299,810 A | 4/1994 | Pierce et al. |
| 5,307,456 A | 4/1994 | MacKay |
| 5,360,108 A | 11/1994 | Alagia |
| 5,368,159 A | 11/1994 | Doria |
| 5,404,391 A | 4/1995 | Wavroch et al. |
| 5,405,152 A | 4/1995 | Katanics et al. |
| 5,583,478 A | 12/1996 | Renzi |
| 5,857,986 A | 1/1999 | Moriyasu |
| 6,764,402 B2 * | 7/2004 | Tajiri et al. ............ 463/43 |
| 7,275,994 B2 | 10/2007 | Eck |
| 7,348,968 B2 * | 3/2008 | Dawson ............ 345/179 |
| 7,508,382 B2 * | 3/2009 | Denoue et al. ............ 345/179 |
| 7,688,310 B2 * | 3/2010 | Rosenberg ............ 345/168 |
| 2002/0161487 A1 * | 10/2002 | Kojima ............ B60T 7/042 701/1 |
| 2004/0193413 A1 * | 9/2004 | Wilson et al. ............ 704/243 |
| 2005/0110778 A1 * | 5/2005 | Ben Ayed ............ 345/179 |
| 2005/0243072 A1 | 11/2005 | Denoue et al. |
| 2006/0158440 A1 | 7/2006 | Ashenbrenner |
| 2008/0309478 A1 * | 12/2008 | Morales ............ B60Q 1/444 340/467 |
| 2014/0253315 A1 * | 9/2014 | Bement ............ B60Q 1/447 340/479 |

FOREIGN PATENT DOCUMENTS

| | | |
|---|---|---|
| EP | 0406729 | 7/1994 |
| WO | 9218925 A1 | 10/1992 |
| WO | 9609617 A1 | 3/1996 |
| WO | 9609695 A1 | 3/1996 |
| WO | 9719398 A1 | 5/1997 |
| WO | 9917850 A2 | 4/1999 |

OTHER PUBLICATIONS

PCT International Search Report for PCT App. No. PCT/US2009/069284, completed Apr. 1, 2010.

Jaleco Ltd, "Cisco Heat," videogame brochure published in Japan, 1990 [retrieved online at http://www.arcadeflyers.com on Jul. 2, 2009].

Jaleco Ltd, "Cisco Heat," videogame brochure published in the United Kingdom, 1990 [retrieved online at http://www.arcadeflyers.com on Jul. 2, 2009].

Jaleco Ltd, "Cisco Heat," videogame brochure published in the United States, 1991 [retrieved online at http://www.arcadeflyers.com on Jul. 2, 2009].

* cited by examiner

TACTILE FEEDBACK APPARATUS AND METHOD

FIELD OF THE INVENTION

The present invention relates to input devices, and more particularly, some embodiments relate to a tactile feedback stylus.

DESCRIPTION OF THE RELATED ART

Modern interactive software programs, such as video games and the like, typically allow the user (e.g., player for a video game) to provide some form of input through a device. For example, for today's typical desktop or laptop computer, the popular form of user input is through a keyboard and mouse. Within the realm of video games, the preferred form of input is through use of a game controller of one form or another. In one example, a controller might be a handheld controller that has input features such as a plurality of buttons, analog joysticks, a D-pad directional control and other user input devices that provide a means for a gamer (i.e. video game player) to input desired control commands to the video game software. In turn, the inputted control commands would typically affect the game activity on the video screen.

For example, a typical controller for a Sony® PlayStation®, Microsoft® XBOX®, or Nintendo® Wii® gaming console is typically connected to the gaming console through a wire or wirelessly and comprises multiple buttons (for example X, O, Δ, □ or X, A, B, Y buttons, trigger buttons) and directional inputs (e.g., analog joysticks, four-way D-Pads). Likewise, handheld and mobile gaming systems, such as the Nintendo® DS™, Nintendo DS Lite™, and Sony® PSP®, have similar such buttons (e.g., X, O, Δ, □ or X, A, B, Y buttons) and directional inputs (e.g., D-Pads), which are usually integrated into the chassis of the system for purposes of size and mobility.

Because some controllers and mobile game systems have pressure sensitive buttons (e.g., trigger buttons) and analog joysticks, such controllers are additionally equipped with an ADC (analog-to-digital converter) for such buttons and directional inputs, allowing for appropriate response with minimal latency.

With regard to game controller form factors, a controller might be configured as a joystick as is popular for flight simulator games, a steering wheel and pedal combination as is popular for driving games, and guitar or other musical instruments for interactive music-based games. These types of controllers are readily available for both gaming consoles and computers. Accordingly, a controller for a gaming console or computer might take on many diverse forms.

During the 1990's, interactivity with computers and game consoles through input devices was improved further with the introduction of tactile feedback, which commonly takes the form of rumble/vibration feedback and force feedback. Until the introduction of tactile feedback, the primary form of feedback, especially for game consoles and mobile game systems, was visual and audio feedback. It is now common for video game manufacturers to incorporate tactile feedback into game controllers. Vibration/rumble feedback is often accomplished by providing motors with offset weighting on their shafts to provide a vibration or rumble sensation when the shaft is rotated. This might be triggered, for example, to make the controller rumble when a bomb is dropped, a car crashes, etc. Game controller vibration can be tailored to offer specific tactile sensations that simulate the type or extent of activity occurring in the game.

The other common form of tactile feedback, force feedback, can be accomplished with servo-mechanisms. A series of motors built into a game controller, directly or indirectly through the use of drive belts or gears, are connected to a game controllers control surfaces to actively oppose physical input made by the gamer. This is known as force feedback, and requires more complex servo-mechanisms and controller design than does passive vibration feedback. For example, in a steering wheel controller, force feedback would require a servo mechanism attached to the shaft of the steering wheel. Upon certain electronic commands, for example, in a very high speed turn, the servo-mechanism would act to make the steering wheel physically more difficult to turn. These various types of vibration or force feedback have become common in modern day video games.

BRIEF SUMMARY OF EMBODIMENTS OF THE INVENTION

The present invention provides apparatuses and methods for a tactile feedback instrument, and more specifically, some embodiments are directed toward methods and apparatuses for a tactile feedback stylus. Some embodiments of the invention provide a stylus used in conjunction with mobile devices, such as, for example, mobile computing devices (e.g., laptops, UMPCs, tablet PCs), personal digital assistants (PDAs), smart phones (e.g., cellular phone and PDA combinations), or handheld/mobile gaming systems (e.g., Nintendo® DS™, Nintendo DS Lite™, and Sony® PSP®). The stylus can be implemented for use as an electronic input device applied against the mobile device's screen, to make direct inputs to the mobile device. Such inputs can be for writing or drawing, for making user selections (for example, selecting radio buttons, and so on) or for other forms of inputs. In order to facilitate input using the stylus, some embodiments utilize a touch screen so that the computing system can sense when and where the stylus makes contact with the screen. Further, within some such embodiments, the touch screen can be configured to be sensitive to the touch of the stylus exclusively, thereby preventing unintentional input by contact with other objects (e.g., a user's finger or hand). In some embodiments, the stylus can include other input mechanisms such as, for example, buttons or switches, to allow user input by mechanisms in addition to or in place of the stylus contacting a touch screen. The stylus can be connected to the computing device via a wired or wireless input.

According to some embodiments of the invention, a game system is provided, comprising a game console and a stylus. Within this embodiment, the stylus comprises an electric motor and a control circuit coupled to the electric motor that is in communication with the game console and controls the electric motor. Within some of these embodiments, the stylus can vibrate or rumble when the electric motor is activated in response to gaming activity. In yet other embodiments, the stylus comprises other or additional feedback mechanisms, such as an electric shock, a temperature gradient, a physical jolt, audible waves, or inaudible waves, for example. These various feedback mechanisms are facilitated using various components, such as electrodes, solenoids, and actuators.

Depending on the embodiment, the stylus is either wired to the game system or connected to the game console wirelessly. For embodiments having a wired stylus, the game console can issue commands to the stylus through the wire. For those embodiments having a wireless connection with the stylus, some utilize a transmitter coupled to the game console and a receiver coupled to the control circuit to establish a wireless connection. Other embodiments having a wireless connection with the stylus utilize a first transceiver coupled to the game console and a second transceiver coupled to the control circuit, through which a wireless connection is established.

In further embodiments, a cartridge that is electronically and mechanically attachable and detachable to the game console houses the transmitter or the transceiver that is coupled to the game console. In some such embodiments, the cartridge further comprises electronic readable medium that stores processor instructions for a game.

In other embodiments, the game console can send a command to the stylus in the form of a signal pulse that triggers activation of the electric motor. In order to generate the signal pulse, some of those embodiments further comprise of a pulse-width modulation generator that is used to generate a signal with a pulse. Further, for some embodiments, this pulse-width modulation generator is housed in a cartridge configured to electronically and mechanically attach and detach from the game console. In some such embodiments, the cartridge further comprises electronic readable medium that stores processor instructions for a game.

With regards to the signal pulse, some embodiments generate the signal pulse at a frequency ranging approximately from 40 Hz to 100 Hz and with a duty cycle ranging approximately from 20% to 80%. In turn, some embodiments further comprise a mono-stable circuit that activates the electric motor for a fixed period of time based on the signal pulse received.

In further embodiments, the stylus further comprises an LED device coupled to the control circuit. According to some embodiments, the LED activates when the electric motor activates. According to other embodiments, the game console sends a command to the stylus to activate the LED.

For embodiments that comprise a first transceiver and a second transceiver, the first transceiver and the second transceiver establish a bi-directional wireless connection between the game console and stylus such that the game console and the stylus can send and receive data and commands between each other. Through the bi-directional wireless connection, some embodiments that further comprise a button on the stylus can send a command to the game console when the button is pressed. In yet further embodiments, the stylus comprises a sensor, such as an accelerometer, a touch sense, a pressure sensor, a moisture sensor, a temperature sensor, a heart-rate sensor, or an orientation sensor, that provides data to the stylus, game console or both. These and other sensors can be utilized to provide biological, physiological or other factors or conditions such as, for example, the user's heart rate, the user's temperature, the level of sweat, the degree of pressure exerted on the grips, and so on.

Further embodiments in accordance with the invention provide a stylus system with features similar to those described above. In yet further embodiments, a stylus apparatus is provided with features similar to those described above.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward apparatuses and methods for a tactile feedback input stylus. A few example devices with which the invention can be implemented for use with mobile devices, such as, for example, mobile computing devices (e.g., laptops, UMPCs, tablet PCs), personal digital assistants (PDAs), smart phones (e.g., cellular phone and PDA combinations), or handheld/mobile gaming systems (e.g., Nintendo® DS™, Nintendo DS Lite™, and Sony® PSP®). The invention can be implemented with a number of computing or processing devices, including portable, transportable, and fixed devices. To facilitate description, the invention is described herein from time to time in terms of use with a hand-held gaming apparatus. Description in these terms allows features and functionality of the invention to be described in the context of an example application. After reading this description, it will become apparent one of ordinary skill in the art how to implement the invention with other devices.

Various embodiments implemented in conjunction with mobile or handheld devices use the stylus as a form of user input device to interact with operating systems or applications running on the device. In some embodiments, the stylus includes a tip, which is applied against the mobile device's screen, to make direct inputs to the mobile device. Such inputs can be made, for example, for purposes of writing or drawing in an application; for making user selections such as for radio buttons, check boxes, selection buttons, and so on, or for other forms of inputs. As a further example, in a gaming environment, the stylus might be used to facilitate direct user input into the gaming application, such as where the game is configured to sense times and locations at which the stylus touches the screen.

In order to facilitate user input using the stylus, some embodiments utilize a touch screen so that the computing system can sense when and at which location the stylus makes contact with the screen. Further, within some such embodiments, the touch screen can be configured to be sensitive to the touch of the stylus exclusively, thereby preventing unintentional input by contact with other objects (e.g., a user's finger or hand). In some embodiments, the stylus can include other input mechanisms such as, for example, buttons or switches, to allow user input by mechanisms in addition to or in place of the stylus contacting a touch screen. In various embodiments, the stylus can be connected to the computing device via a wired or wireless input.

Figure 1:
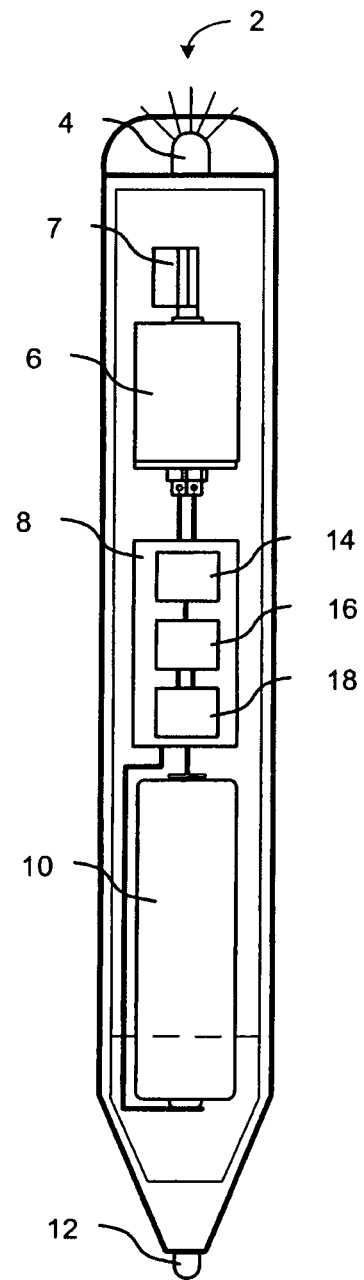
FIG. 1 is a diagram of an example stylus apparatus in accordance with one embodiment of the invention.

FIG. 1 is a diagram of an example stylus apparatus 2 in accordance with one embodiment of the invention. Referring now to FIG. 1, the stylus in this example comprises an LED device 4, an electric motor 6, a control module 8, and a power source 10.

In this example, the electric motor 6 is provided as the mechanism that provides vibration to the stylus 2. As illustrated in FIG. 1, electric motor 6 includes an offset or unbalanced weight 7 mounted to its shaft, which provides the stylus with a vibration or rumble sensation when the electric motor is activated. The electric motor 6 is coupled to control module 8, which activates electric motor 6 and can control various parameters of the electric motor's operation, such as timing, speed and direction of rotation. Other mechanisms can be provided for the tactile feedback sensation in place of or in addition to motor 6, including for example, coil-and-plunger vibrators, piezo-electric vibrators, sound-pressure mechanisms, and so on. Alternative embodiments include a feedback mechanism, such as a speaker, a sound actuator, or a buzzer for example, that allows the stylus to emit audible waves or inaudible waves (e.g., sound waves, ultrasound waves, pressure waves).

Additional mechanisms, such as electrodes, can be added to the stylus to provide an electro stimulus through the stylus, such as an electric shock or changes in temperature gradient. Yet other feedback mechanisms can provide a physical jolt that would impede accurate control of the stylus by the user. Such a mechanism can be implemented using, for example, a heavy piston solenoid or a hammer mechanism. Such mechanisms would be activated based on user input.

Control module 8 in this example includes a switching regulator 14, a receiver 16, and a control block 1I, that enable control of the electric motor 6. Regulator 14 can be included in various embodiments to provide voltage levels as desired for various components of the stylus 2. Accordingly, regulator 14 can be coupled to the power source 10 to provide voltage division or other power conditioning as may be appropriate. In this example, power source 10 is a battery, however other power supply mechanisms can be utilized.

Receiver 16 can be configured to receive input from the electronic device such as signals that are used to control characteristics of the tactile feedback. In the illustrated embodiment, receiver 16 is a wireless receiver that receives a control signal sent by the electronic device and that is encoded to include information such as timing, duration, intensity and frequency of vibration. Accordingly, controller 18 can be configured to decode information in the received encoded signal and to generate therefrom the appropriate control signal to drive the motor 6. In various embodiments, this involves controlling the frequency and duty cycle of the motor via the signal or command received the stylus. Although not illustrated, appropriate drive circuitry can be included to provide a signal with the appropriate electrical characteristics to drive motor 6. Examples of signals and signal pulses are discussed below with respect to the example signals illustrated in FIGS. 3-5.

Within the context of gaming systems, for games enabled to use a stylus during game play, the vibration mechanism (e.g., motor 6) can be configured to be activated based on activity occurring within the game. For example, with respect to a maze video game where a user uses the stylus to get through a maze, the electric motor may be triggered when the stylus touches the maze wall displayed on the game system screen or encounters a dangerous obstacle in the maze. As another example, within a game where the objective is to pop balloons falling from the top of the screen, the electric motor may be triggered when the stylus makes contact with a falling balloon and pops it. Typically, the intensity and duration of the vibration is based on the type and extent of activity taking place in the game. Likewise, activity occurring in the operating system or applications of the computing device can be used to trigger the vibration mechanism in a non-game related applications. For example, stylus vibration might be triggered when the application issues an operational error or warning. As another example, stylus vibration might be triggered as a tactile feedback mechanism to register keystroke activity or button-press actions for the application.

Stylus tip 12 is the component of the stylus that makes contact with the device screen during user input. In some embodiments, the stylus tip 12 comprises an embedded sensor that enables the stylus to measure the amount of pressure with which it is being applied against the device screen. In other embodiments, stylus tip 12 might have particular characteristics such that it can be identified by the gaming system or other electronic device as a stylus acceptable for user inputs. For example, the electronic device might be designed to be responsive only to a metallic tip, a magnetic tip, or other particular configuration.

LED 4, or other visual indicator, can be included as a mechanism for providing visual confirmation or information to the user. For example, LED 4 might be provided as a power-status indicator, a game-feedback mechanism, or to provide other information of interest to the user. Although a single LED is illustrated, other forms of visual feedback can be provided including, for example, multicolor displays, multi-component displays, alphanumeric displays, LCD or other display screens, and so on.

Figure 2:
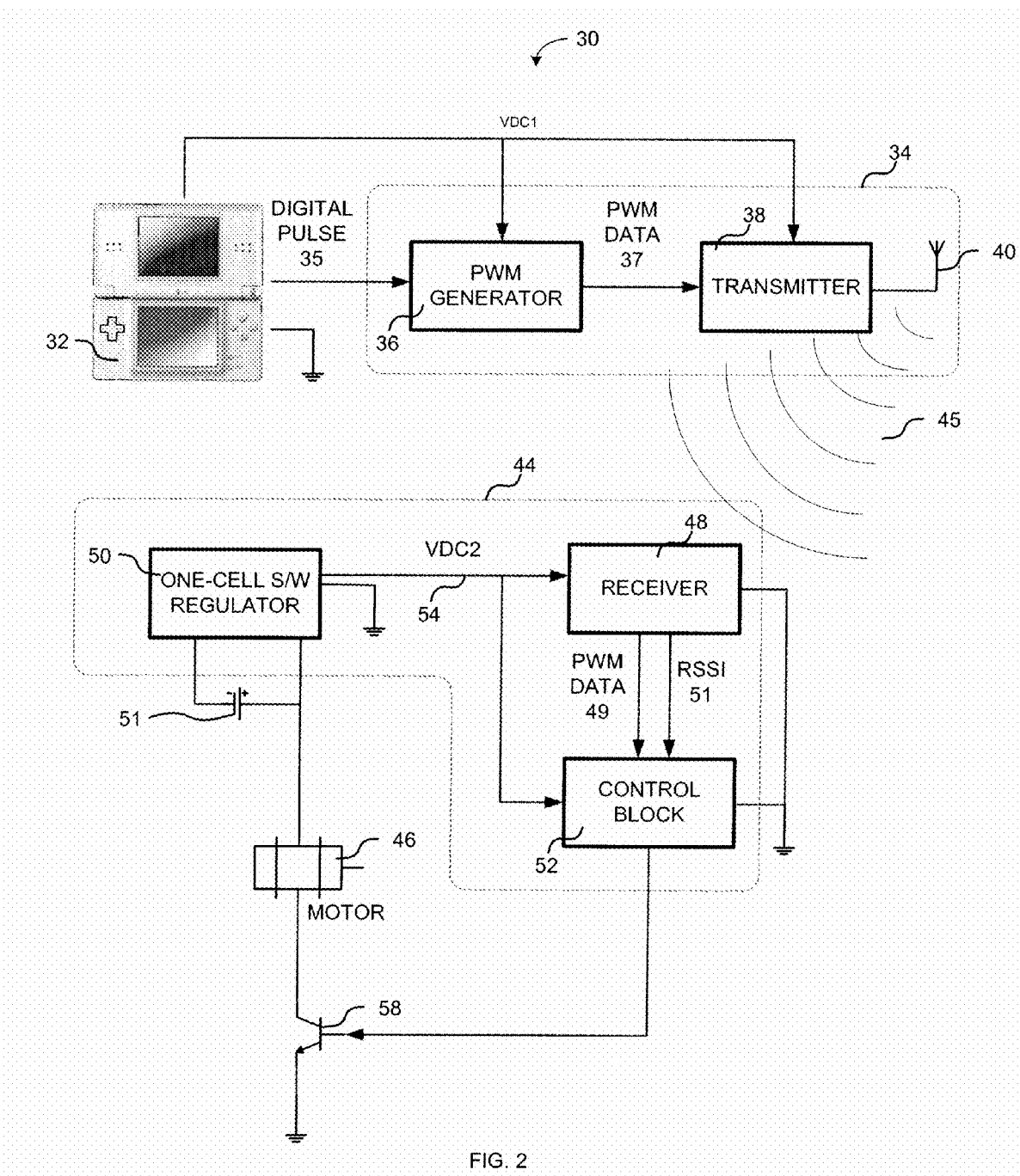
FIG. 2 is a diagram of an example game system in accordance with one embodiment of the invention.

Referring now to FIG. 2, one example game system 30 in accordance with an embodiment is provided. Specifically, the game system 30 in this example comprises a game console 32, stylus transmission module 34, and stylus control circuit 44. As described earlier, game console 32 can include includes game platforms such as Nintendo® DS™, Nintendo DS Lite™, and Sony® PSP®. In the alternative, a person of ordinary skill in the art would appreciate that system 30 could be implemented using other mobile devices, such mobile computers (e.g., laptops, UMPCs, tablet PCs), personal digital assistants (PDAs), and smart phones (e.g., a cellular phone and PDA combination).

In the example illustrated in FIG. 2, stylus transmission module 34 comprises a pulse-width modulation (PWM) module 36, a transmitter 38 and an antenna 40. Stylus transmission module 34 can, in one embodiment, be an integrated module incorporated or built into gaming console 32. In other embodiments, stylus transmission module 34 can be an external or plug-in module that is configured to be plugged into a port in gaming console 32. Accordingly, in some embodiments, stylus transmission module 34 is housed in a cartridge that fits into a game slot or expansion slot of game console 32. This cartridge, also referred to as a pack or module, can be both electronically and mechanically attachable to and detachable from game console 32.

Pulse-width modulation (PWM) generator 36 receives a standard digital pulse train 35 from game console 32 and converts it into a pulse-width modulated signal. In various embodiments, the digital pulse 35 is defined and controlled by software (e.g., the video game) running on game console 32. Accordingly game console 32 software can be configured to output particular pulse trains 35 depending on application activity. Because the PWM signal 37 is generated in one embodiment based on the actual content or characteristics of pulse train 35, the PWM signal 37 can reflect game activity or other software occurrences. Thus, by controlling the digital pulse output from game console 32, the console software indirectly controls the generation of the pulse-width modulation signal 37, which effectively controls the signal 45 transmitted to stylus control circuit 44. The transmitted signal 45 (i.e. wireless signal), in turn, determines the frequency and duty cycle of electric motor 46 within the stylus.

When the transmitter module 38 receives the pulse-width modulated signal 37, it modulates the PWM signal 37 onto a wireless carrier and transmits the resultant wireless signal 45 to control circuit 44 via antenna 40. Control circuit 44, which is at the stylus, receives wireless signal 45 through receiver module 48. Wireless signal 45 is demodulated to recover PWM signal 49, which is encoded with specific information for control circuit 44 to activate the electric motor 46. Motor control is facilitated through control block 52, which controls transistor 58 to turn the motor on and off in accordance with PWM signal 49. Control block 52 also deactivates the motor via transistor 58 when the transmitter (i.e. stylus module 34) has been turned off or the stylus is too far away from the transmitter. For power, one-cell switching regulator 50 elevates the voltage provided by battery 51 (or other power source) to a level required by receiver IC 48. Receiver module 48 indirectly controls the electric motor 46 according to wireless signal 45 by providing signal 45 to control block 52. In addition, control block 52 detects when the stylus is too far away from the transmitter through the received signal strength indicator (RSSI) 51 provided by the receiver IC 48. In the embodiment illustrated in FIG. 2, PWM generator 36 is included with module 34 to provide PWM data 37 before transmission to control module 44. In such embodiments, control module 44 can be configured to demodulate the received signal 45 to recover pulse width modulated data 49 to drive motor 46.

In other embodiments, digital pulse train 35 can be modulated onto a wireless carrier and transmitted to control module 44 and a PWM generator provided at control module 44 to generate pulse width modulated data. For example, in one embodiment, control block 52 contains a mono-stable circuit to control electric motor 46. Mono-stable circuits have only one permanent stable state that changes to an unstable state when triggered by an external pulse. Once the activation time elapses, the mono-stable circuit reverts to its permanent stable state and awaits another trigger pulse. Accordingly, control block 52 can include a mono-stable circuit to generate a motor drive signal triggered by digital pulse train 35 or by pulse-width modulated data 49.

Alternatively, the mono-stable circuit as described above can be located within the PWM generator, which can be located either within the stylus or within the transmitter module 38. In yet other embodiments, the mono-stable circuit is located within the transmitter module 38 but external to the PWM generator.

In accordance with some embodiments, a digital signal having pulses is generated by a game console such that the signal has an on-time during a high state and an off-time during a low state. The digital pulses, comprising the rise and fall transitions of the digital signal are subsequently converted to pulses within a wireless signal and, transmitted to the stylus by the stylus transmission module.

By transmitting a wireless signal containing pulses to the stylus, the stylus mono-stable circuit becomes unstable upon every pulse for a fixed period of time ($\tau$). For that fixed period of time, the mono-stable circuit activates the electric motor 46. If the output of the mono-stable circuit is high (i.e. electric motor 46 is activated) when a pulse is received by the stylus, the time output of the mono-stable circuit is extended by the fixed period of time ($\tau$). Note, the fixed period of time ($\tau$) is determined by the components and configuration of the mono-stable circuit.

Figure 3:
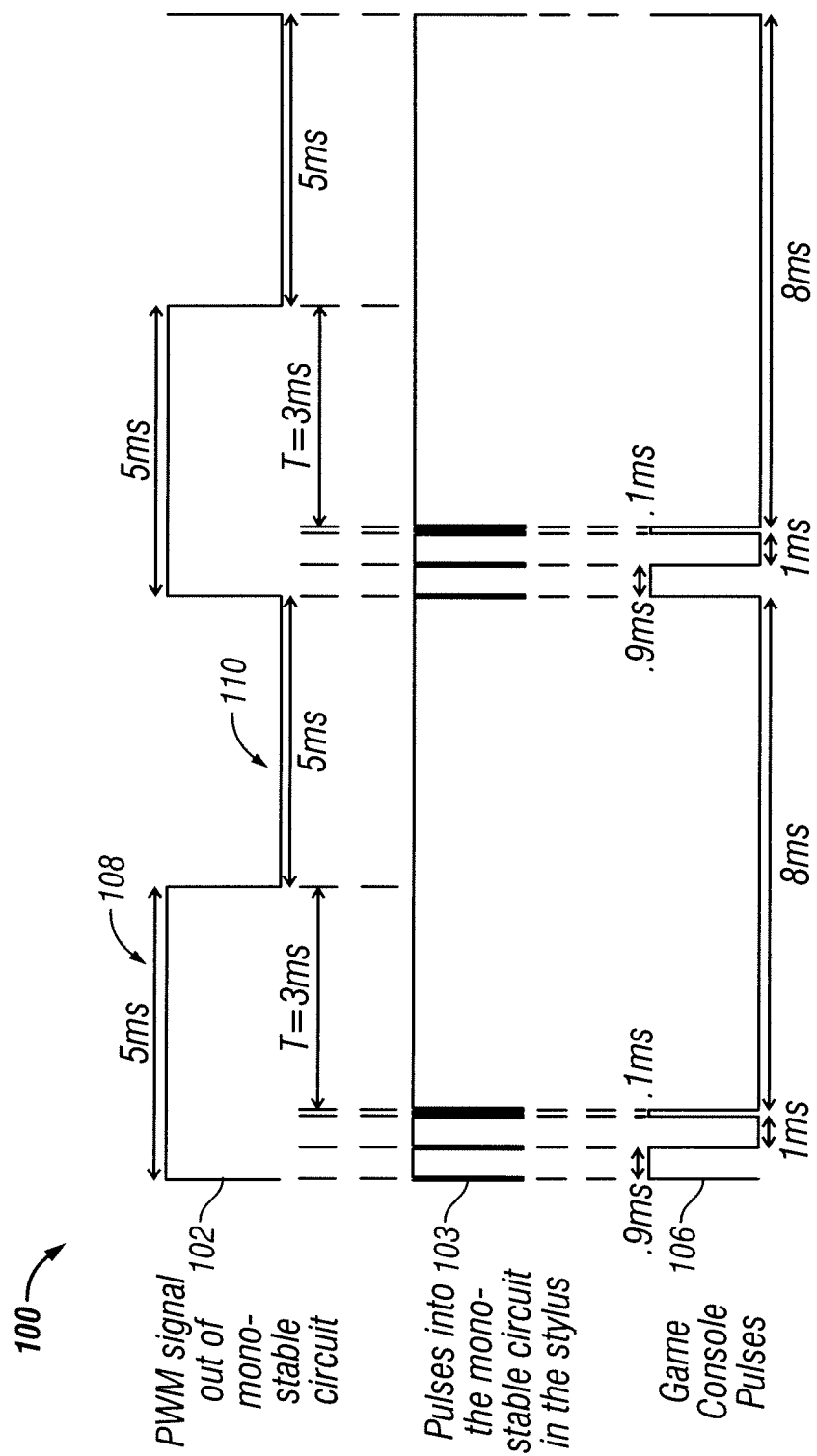
FIG. 3 is a chart illustrating example signals in accordance with one embodiment of the invention.

FIG. 3 is a chart illustrating an example of signals generated by a game console, resultant pulses into the mono-stable circuit of the stylus, and the PWM signal out of the mono-stable circuit in accordance with one embodiment of the invention. In particular, the chart illustrates an embodiment where the PWM signal 102 has a frequency of 100 MHz and a duty cycle of 50%. In order to generate PWM signal 102, game console digital signal 106 is converted to signal 104 in accordance with the some methodologies of the invention. That is, rising and falling edges of game console pulses 106 results in pulses 104 that are provided to the mono-stable circuit in the stylus. The occurrence of pulses 104 trigger the mono-stable circuit to generate an output signal 108. In this example, the time constant for the mono-stable circuit, $\tau$, is 3 ms. Accordingly, upon the occurrence of a pulse 104, the output of mono-stable circuit is high for 3 ms. If another pulse 104 is received within this 3 ms window, the output of the mono-stable circuit remains high for 3 more ms. This is illustrated in FIG. 3. As also shown in FIG. 3, after 3 ms has elapsed with no pulse being received, the output of the mono-stable circuit transitions to a low state 110 until the next pulse is received. In one embodiment, when the PWM signal is high 108, the electric motor is active and when the PWM signal is low 110, the electric motor is inactive.

As described above with reference to FIG. 2, in some embodiments, a module is provided at the gaming console 32 and another module provided at the stylus. Accordingly, as also shown in FIG. 2, the generator used to generate PWM signal 102 can be provided, for example, in a module like module 34 at gaming console 32. In other embodiments, game console pulses 106 can be transmitted to the stylus, and the conversion can take place from game console pulses to a PWM signal in the stylus.

Figure 4:
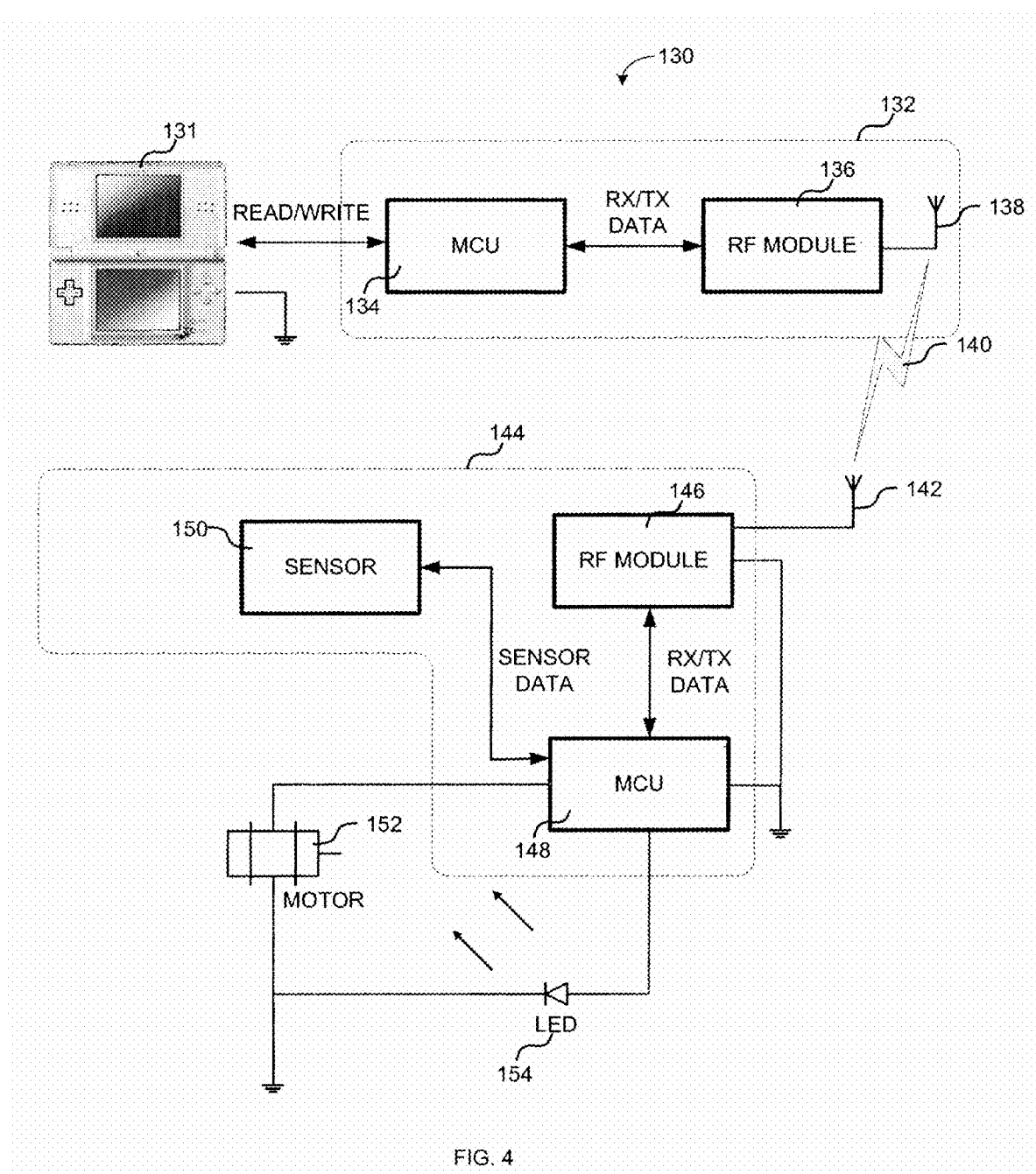
FIG. 4 is a diagram of an example game system in accordance with one embodiment of the invention.

Although the embodiment illustrated in FIG. 2 shows wireless communication in one direction from the gaming console to the stylus, bi-directional communication can be provided as well. A bi-directional communication interface might be included, for example, to allow feedback or control information to be provided from stylus to the electronic device. For example, buttons, triggers and switches can be included with the stylus to allow the stylus to accept user input for the application in addition to conventional touch-screen stylus inputs. FIG. 4 is a diagram illustrating an example game system 130 implementing a bi-direction connection in accordance with an embodiment of the invention. The game system 130 comprises a game console 131, stylus transceiver module 132, and stylus control circuit 144. The stylus transceiver module 132 comprises a micro-controller unit (MCU) 134 and a radio-frequency (RF)

module 136. Through the micro-controller unit 134, stylus transceiver module 132 is able to read data from and write data to the game console 131. Game console 131, in turn, can both issue commands to the stylus and receive sensor data, keystroke or other input data from the stylus. Communication with the stylus is accomplished in this example through RF Module 136, which establishes a bi-directional wireless connection 140 between stylus transceiver module 132 and stylus control circuit 144.

Stylus control circuit 144 in this example includes an RF module 146, a sensor 150, and MCU 148. RF module 146 facilitates communication between the stylus control circuit 144 and stylus transceiver 132. From sensor 150, MCU 148 collects sensor data and relays the information to the stylus transceiver module 132. Sensor 150 can include, for example, an accelerometer, a pressure sensor, a touch sensor, a moisture sensor, a temperature sensor, a heart-rate sensor and an orientation sensor. These and other sensors provide not only information about the stylus, but also biological and physiological information related to the user of the stylus. For example, various different configurations of moisture sensors and heart-rate sensors can be incorporated into a stylus to sense the biological or physiological condition of the stylus user. The MCU 148 can be configured to receive game data (for example, game pulses 106 or converted pulses 104, and generate a PWM signal to control electric motor 152. MCU can also be configured to receive game data to control LED device 154 or other visual display in accordance with data received through RF module 146. Although not illustrated in this example, stylus control circuit 144 can also include input circuitry to receive inputs from triggers, d-pads, buttons, trackballs, or other input mechanisms.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A game system, comprising:
    a game console;
    a stylus, wherein the stylus comprises:
        an electric motor,
        a receiver, and
        a control circuit electrically coupled to the electric motor and electrically coupled to the receiver, wherein the control circuit is in communication with the game console through the receiver and controls the electric motor; and
    a cartridge detachably coupled to the game console, the cartridge comprising:
        a pulse-width modulator configured to generate a signal pulse, and
        a transmitter electrically coupled to the game console and configured to transmit the signal pulse to the stylus to trigger activation of the electric motor.

2. The game system of claim 1, wherein the stylus rumbles or vibrates when the electric motor is activated.

3. The game system of claim 1, wherein the stylus further comprises a feedback mechanism electrically coupled to the control circuit that provides an electric shock, a temperature change, a physical jolt, audible waves or inaudible waves.

4. The game system of claim 1, wherein the cartridge is a game cartridge comprising an electronically readable medium storing instructions to enable the game console to execute a computer game.

5. The game system of claim 1, wherein the signal pulse has a frequency approximately ranging from 40 Hz to 100 Hz and a duty cycle approximately ranging from 20% to 80%.

6. The game system of claim 1, wherein the stylus further comprises a mono-stable circuit that activates the electric motor for a fixed period of time based on the signal pulse received.

7. The game system of claim 1, wherein the stylus further comprises an LED electrically coupled to the control circuit.

8. The game system of claim 1, wherein the LED activates when the electric motor activates.

9. The game system of claim 1, wherein the game console sends a command to the stylus to activate the LED.

10. The game system of claim 1, further comprising a first transceiver comprising the transmitter and a second transceiver comprising the receiver, wherein the first transceiver and the second transceiver establish a bi-directional wireless connection between the game console and stylus through which the game console and the stylus can send and receive data and commands.

11. The game system of claim 10, wherein the stylus further comprises a button for sending commands to the game console.

12. The game system of claim 10, wherein the stylus further comprises a sensor.

13. The game system of claim 12, wherein the sensor comprises an accelerometer, a touch sensor, a pressure sensor, a moisture sensor, a temperature sensor, a heart-rate sensor, or an orientation sensor.

14. A stylus system, comprising:
    a stylus, wherein the stylus comprises:
        an electric motor,
        a control circuit electrically coupled to the electric motor, wherein the control circuit controls the electric motor, and
        a receiver, wherein the receiver is electrically coupled to the control circuit; and
    a cartridge configured to detachably couple to a game console, the cartridge comprising:
        a pulse-width modulator configured to generate a signal pulse, and
        a transmitter configured to electrically couple to the game console and transmit the signal pulse to the stylus to trigger activation of the electric motor.

15. The stylus system of claim 14, wherein the stylus rumbles or vibrates when the electric motor is activated.

16. The stylus system of claim 14, wherein the stylus further comprises a feedback mechanism electrically coupled to the control circuit that provides an electric shock, a temperature change, a physical jolt, audible waves or inaudible waves.

17. The stylus system of claim 14, wherein the transmitter and the receiver establish a wireless connection such that the transmitter can issue commands to the stylus.

18. The stylus system of claim 14, wherein the cartridge is a game cartridge comprising an electronically readable medium storing instructions to enable the game console to execute a computer game.

19. The stylus system of claim 14, wherein the signal pulse has a frequency approximately ranging from 40 Hz to 100 Hz and a duty cycle approximately ranging from 20% to 80%.

20. The stylus system of claim 14, wherein the stylus further comprises a mono-stable circuit that activates the electric motor for a fixed period of time upon receiving the signal pulse.

21. The stylus system of claim 14, wherein the stylus further comprises an LED electrically coupled to the control circuit.

22. The stylus system of claim 21, wherein the LED activates when the electric motor activates.

23. The stylus system of claim 21, wherein the game console sends a command to the stylus to activate the LED.

24. A stylus system, comprising:
    a stylus, wherein the stylus comprises:
        an electric motor,
        a control circuit electrically coupled to the electric motor, wherein the control circuit controls the electric motor, and
        a first transceiver, wherein the first transceiver is electrically coupled to the control circuit; and
    a cartridge configured to detachably couple to a game console, the cartridge comprising:
        a pulse-width modulator configured to generate a signal pulse, and a second transceiver configured to electrically couple to the game console and transmit the signal pulse to the stylus to trigger activation of the electric motor.

25. The stylus system of claim 24, wherein the stylus rumbles or vibrates when the electric motor is activated.

26. The stylus system of claim 24, wherein the stylus further comprises a feedback mechanism electrically coupled to the control circuit that provides an electric shock, a temperature change, a physical jolt, audible waves or inaudible waves.

27. The stylus system of claim 24, wherein the first transceiver and the second transceiver establish a bi-directional wireless connection through which the first transceiver and the second transceiver can send and receive data and commands.

28. The stylus system of claim 24, wherein the stylus further comprises a button for sending commands to the game console.

29. The stylus system of claim 24, wherein the stylus further comprises a sensor.

30. The stylus system of claim 29, wherein the sensor comprises an accelerometer, a touch sensor, a pressure sensor, a moisture sensor, a temperature sensor, a heart-rate sensor, or an orientation sensor.

31. The stylus system of claim 24, wherein the stylus further comprises an LED electrically coupled to the control circuit.

32. The stylus system of claim 31, wherein the LED activates when the electric motor activates.

33. The stylus system of claim 31, wherein the game console sends a command to the stylus to activate the LED.

34. The stylus system of claim 24, wherein the cartridge is a game cartridge comprising an electronically readable medium storing processor instructions to enable the game console to execute a computer game.

* * * * *